United States Patent
Zielinski et al.

(10) Patent No.: US 9,815,739 B2
(45) Date of Patent: Nov. 14, 2017

(54) POLYISOCYANURATE BASED CEMENT FOR WELLBORE FLUID LOSS PREVENTION

(71) Applicant: Covestro LLC, Pittsburgh, PA (US)

(72) Inventors: David P Zielinski, Wexford, PA (US); Michael K. Jeffries, Follansbee, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/928,108

(22) Filed: Oct. 30, 2015

(65) Prior Publication Data

US 2017/0121225 A1 May 4, 2017

(51) Int. Cl.
*C09K 8/00* (2006.01)
*C04B 24/28* (2006.01)
*C09K 8/44* (2006.01)

(52) U.S. Cl.
CPC .............. *C04B 24/282* (2013.01); *C09K 8/44* (2013.01)

(58) Field of Classification Search
CPC ................................ C04B 24/282; C09K 8/44
USPC ........................................................ 523/130
See application file for complete search history.

(56) References Cited

U.S. PATENT DOCUMENTS

| 3,682,245 A | 8/1972 | Argabright et al. |
| 4,540,781 A | 9/1985 | Barsa |
| 6,765,111 B1 * | 7/2004 | Pedain ................. C07D 251/34 544/193 |
| 8,876,437 B2 | 11/2014 | Ballard |
| 2010/0087566 A1 | 4/2010 | Ballard |
| 2011/0253372 A1 | 10/2011 | Crandall et al. |
| 2013/0115467 A1 * | 5/2013 | Dries ................... C08G 18/092 428/425.8 |
| 2014/0058102 A1 * | 2/2014 | Halpaap ............... C07D 251/34 544/221 |
| 2015/0125704 A1 | 5/2015 | Dries et al. |
| 2015/0166872 A1 | 6/2015 | Zielinski et al. |
| 2015/0285027 A1 | 10/2015 | McDonnell et al. |

* cited by examiner

Primary Examiner — David T Karst
(74) Attorney, Agent, or Firm — John E. Mrozinski, Jr.

(57) ABSTRACT

The present invention provides an oil or gas wellbore polymeric cement comprising the reaction product of an aliphatic isocyanate, a trimerization catalyst, and a catalyst retarder, wherein the reaction occurs in the wellbore at a temperature of at least 250° F. (121° C.). Also provided is a method of reducing fluid loss from an oil or gas well, comprising producing a polyisocyanurate cement by combining an aliphatic isocyanate, a trimerization catalyst, and a catalyst retarder within a wellbore at a temperature of at least 250° F. (121° C.). The various embodiments of the invention meet the controllability and minimized toxicity needed for this application. Standard aliphatic polyisocyanates reduce handling concerns while providing the reactivity response that fits this temperature range.

7 Claims, 2 Drawing Sheets

POLYISOCYANURATE BASED CEMENT FOR WELLBORE FLUID LOSS PREVENTION

FIELD OF THE INVENTION

The present invention relates in general to oil and gas drilling and more specifically to preventing the loss of drilling fluid during the creation of an oil or gas well by providing a solid polymer plug made from polyisocyanurate plastic at a well temperature range of above 250° F. (121° C.).

BACKGROUND OF THE INVENTION

The recovery of resources, such as natural gas or oil, from underground formations typically entails drilling a wellbore to the formation while circulating a drilling fluid, such as a water-based or oil-based drilling mud, within the wellbore. The drilling fluid flows down through the drill pipe (sometimes called a "drill string"), exits the pipe at a location adjacent the drill bit and then flows up through an annulus formed between the outside of the pipe and the wellbore wall. Circulation of the drilling fluid lubricates the drill bit and removes cuttings from the wellbore.

One problem encountered in such a resource recovery process is the loss of the drilling fluid to the underground formation during circulation of the fluid in the wellbore (a problem sometimes referred to as "lost circulation"). Drilling fluids may be lost to the underground formation (instead of circulating back up the wellbore) for a variety of reasons, such as, for example, the natural porosity of formation. Lost circulation can be problematic for several reasons, including, the high cost of replacing lost drilling fluids and the need to interrupt drilling until a problem resulting from lost circulation (such as breakage of the drill bit) is solved. Loss of drilling fluid into fractured, vugular or rubblized rock formations during the drilling operation of an oil or gas well may also raise safety concerns.

To address the problem of the loss of the drilling fluid, "lost circulation materials" ("LCMs"), are sometimes injected into the wellbore in an attempt to seal the pores of the porous underground formation. One commonly used lost circulation material is cement. Cement as an LCM, however, has a number of drawbacks: it is only of limited sealing effectiveness; it is prone to cracking; it requires a very long time (approximately 24 hours) to cure; it is typically of a viscosity that does not allow it to be squeezed into cracks in an underground formation; and it must remain immobile to cure.

As a result, synthetic polymers, such as polyurethanes, have also been proposed for use as a lost circulation material. As an LCM, polyurethanes have, however, also been difficult to implement. For example, many previous polyurethane-forming compositions have had an unacceptably short pot-life (i.e., the amount of time the combination of an active-hydrogen functional component, such as a polyol, and an isocyanate-functional component remains pumpable). As a result, complicated and cumbersome equipment options have been proposed to keep the reactive components separated during injection into the wellbore.

The use of blocked polyisocyanates to form polyurethane lost circulation materials has been proposed as an alternative. Blocked polyisocyanates, however, require removal of the blocking agent in order for the isocyanate groups to react with an active-hydrogen functional component. When a liquid system is contained under pressure, as is the case in an LCM application, it is difficult, if not impossible, to remove the blocking agent. In addition, blocked polyisocyanate resins are usually very high in viscosity. As a result, they can be very difficult to pump down the well bore without the use of solvents and/or plasticizers, which can be undesirable.

Polymers with polyisocyanurate structure are known for their high temperature stability and flame retardancy. Polyisocyanurate foams based on the aromatic diphenylmethane 4,4'-diisocyanate (MDI), for example, are in widespread use, especially as high-performance insulating materials, due to their very low thermal conductivity.

As a result, it would be desirable to provide improved methods of treating a wellbore within an underground formation using a treatment composition that overcomes at least some of the foregoing problems. Creating an effective polymeric plug or cement that can prevent the loss by solidifying in the loss zone at various down-hole temperatures is a need in the art. Especially challenging is creating a stable plug at down-hole temperatures of between 250° F. (121° C.) and 300° F. (149° C.).

SUMMARY OF THE INVENTION

Accordingly, the present invention helps alleviate problems inherent in the art by utilizing trimerized polyisocyanates as a means to achieve a controllable polymerization reaction at temperatures to provide a solid polymer plug at as high a temperature as 300° F. (149° C.) in the down-hole environment.

Various embodiments of the present invention target a well temperature range of above 250° F. (121° C.) where controlling the reactivity of a two-component polyurethane based cement becomes unworkable. A trimerization catalyst produces a solid gel from a liquid isocyanate in a reaction that can be controlled at temperatures above 250° F. (121° C.). There are several types of catalysts that can promote trimerization of liquid monomeric and polymeric isocyanates. The various embodiments meet the controllability and minimized toxicity needed for this application. Standard aliphatic polyisocyanates reduce the handling concerns while providing the reactivity response that fits this temperature range.

It is understood that the invention disclosed and described in this specification is not limited to the embodiments summarized in this Summary.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Various embodiments are described and illustrated in this specification to provide an overall understanding of the structure, function, operation, use, and manufacture of the disclosed invention(s). The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other material identified herein is incorporated herein by reference in its entirety unless otherwise indicated, but only to the extent that the incorporated material does not conflict with existing definitions, statements, or other disclosure material expressly set forth herein. As such, and to the extent necessary, the express disclosure as set forth herein supersedes any conflicting material incorporated by reference. Any material, or portion thereof, that is said to be incorporated by reference herein, but which conflicts with a definition, statement, or other disclosure material set forth herein, is only incorporated to the extent that no conflict arises between the incorporated material and the present disclosure. Applicant reserves the right to amend this specification to expressly recite any subject matter, or portion thereof, incorporated by reference herein.

Reference throughout this specification to "certain embodiments", "some embodiments", "various non-limiting embodiments," or the like, means that a particular feature or characteristic may be included in an embodiment. Thus, use of such phrases, and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In some embodiments, the present invention utilizes a polyisocyanurate plastic which is obtained by catalytic trimerization of a polyisocyanate composition which comprises oligomeric polyisocyanates and is low in monomeric diisocyanates, with "low in monomeric diisocyanates" meaning that the polyisocyanate composition has a monomeric diisocyanates content of not more than 20 wt %.

In some embodiments, the polyisocyanurate plastics useful in the invention are prepared by a method comprising the following steps:

a) providing a polyisocyanate composition which comprises oligomeric polyisocyanates and is low in monomeric diisocyanates, where "low in monomeric diisocyanates" means that the polyisocyanate composition has a monomeric diisocyanates content of not more than 20 wt %; and b) catalytically trimerizing the polyisocyanate composition.

Embodiments of the invention described in more detail hereinafter are based on the surprising observation that by catalytic trimerization of low-monomer-content oligomeric polyisocyanate compositions it is possible to obtain polyisocyanurate plastics which have many advantageous properties and are particularly useful in providing a solid polymer plug at as high as 300° F. (149° C.) in the down-hole environment.

Various embodiments of the invention relate to the trimerization of aliphatic polyisocyanates as a means to achieve a controllable polymerization reaction at temperatures above 250° F. (121° C.) in the down-hole environment. Aliphatic polyisocyanates (stripped of free monomer) can be further trimerized by using trimerization catalysts like TRITON B, methylcholine, potassium octoate, and the like. This reaction requires temperatures in this range to be effective but tends to be uncontrollable once the trimerization reaction is initiated. A catalyst scheme as well as a retarder have been discovered and are described which yield a solid polymer plug at temperatures as high as 300° F. (149° C.). Using a combination of potassium octoate and octanoic acid, the level of acid can be increased to achieve a longer delay before trimerization commences. Embodiments of present invention do not include a coreactant in an effort to improve control of the reaction at these high temperatures.

The use of low-monomer-content oligomeric polyisocyanate compositions in place of monomeric diisocyanates as starting materials for the production of polyisocyanurate plastics has the advantage that in view of the lower isocyanate contents of the oligomeric reactants, the heat of reaction to be taken off in the course of curing is much lower, a feature which also makes the production of large-volume components easier, in particular. Furthermore, the use of low-monomer-content polyisocyanate compositions which comprise oligomeric polyisocyanates as oligomeric reactants for the trimerization reaction leads also to a crosslinking structure in the polyisocyanurate plastic, making this plastic structurally different from materials known in the art.

A "polyisocyanurate plastic" as used herein is a plastic which comprises polyisocyanurate. It may also consist primarily or completely of a polyisocyanurate. Blends of polyisocyanurates and other plastics are likewise included in the term "polyisocyanurate plastic" as used herein.

Reference here to "plastic" is consequently to a product which at room temperature—unlike, for example, gels or liquids—is very largely dimensionally stable. The term "plastic" as used herein encompasses all customary classes of plastic, thus including, in particular, thermosets, thermoplastics and elastomers.

A "polyisocyanurate", as used herein, is any molecule, preferably a polymer, which has a plurality of isocyanurate structural units, as for example at least 10 isocyanurate structural units. A molecule with a single isocyanurate structural unit may be termed "isocyanurate".

The characteristic, cyclic isocyanurate structural unit is shown in the following structural formula:

Isocyanurates and polyisocyanurates may be obtained by cyclotrimerization of polyisocyanates. The conventionally operated cyclotrimerization starting from monomeric diisocyanates is—as described above—a highly exothermic reaction. This may considerably restrict the possible applications and also the degrees of trimerization that are still realizable efficiently and technically.

The term "polyisocyanate", as used herein, is a collective designation for compounds which contain two or more isocyanate groups in the molecule (the skilled person understands isocyanate groups to be free isocyanate groups of the general structure —N=C=O). The simplest and most important representatives of these polyisocyanates are the diisocyanates. These have the general structure O=C=N—R—N=C=O, with R customarily representing aliphatic, alicyclic and/or aromatic radicals.

Due to their multiple functionality (≥2 isocyanate groups), it is possible to prepare a multiplicity of polymers (e.g. polyurethanes, polyureas and polyisocyanurates) and low molecular mass compounds (e.g. those with uretdione, isocyanurate, allophanate, biuret, iminooxadiazinedione and/or oxadiazinetrione structure) from polyisocyanates.

Where reference is made generally to "polyisocyanates", the specific reference is to monomeric and/or oligomeric polyisocyanates equally. For the understanding of many aspects of the invention, however, it is important to differentiate between monomeric diisocyanates and oligomeric polyisocyanates. Reference to "oligomeric polyisocyanates-"therefore means polyisocyanates constructed from at least two monomeric diisocyanate molecules, these being compounds which represent or comprise a reaction product composed of at least two monomeric diisocyanate molecules.

The preparation of oligomeric polyisocyanates from monomeric diisocyanates may also be referred to herein as modification of monomeric diisocyanates. This "modification", as used herein, denotes the reaction of monomeric isocyanates to form oligomeric polyisocyanates with uretdione, isocyanurate, allophanate, biuret, iminooxadiazinedione and/or oxadiazinetrione structure.

Thus, for example, hexamethylene diisocyanate (HDI) is a "monomeric diisocyanate", as it contains two isocyanate groups and is not a reaction product of at least two polyisocyanate molecules:

HDI

Reaction products formed from at least two HDI molecules and still possessing at least two isocyanate groups, conversely, are "oligomeric polyisocyanates" in the sense of the invention. Representatives of such "oligomeric polyisocyanates" starting from monomeric HDI are, for example, HDI isocyanurate and HDI biuret, constructed in each case from three monomeric HDI building blocks:

HDI isocyanurate

HDI biuret (idealized structural formulae)

"Polyisocyanate composition" in the sense of the invention refers to the isocyanate component in the initial reaction mixture. Expressed alternatively, it is the sum total of all compounds in the initial reaction mixture that have isocyanate groups. The polyisocyanate composition is therefore used as a reactant in the method of the invention. Where reference is made here to "polyisocyanate composition", and in particular to "provision of the polyisocyanate composition", this means that the polyisocyanate composition exists and is used as a reactant.

In accordance with the invention, the polyisocyanate composition used as a reactant in the trimerization is of low monomer content (i.e. low in monomeric diisocyanates) and already comprises oligomeric polyisocyanates. According to various embodiments of the invention, the polyisocyanate composition comprises entirely or to an extent of at least 80, 85, 90, 95, 98, 99 or 99.5 wt % of oligomeric polyisocyanates, based in each case on the weight of the polyisocyanate composition. This oligomeric polyisocyanates content relates to the polyisocyanate composition, i.e. the polyisocyanates are not formed, for instance, as an intermediate during the method of the invention, but instead are already present at the start of the reaction, in the polyisocyanate composition used as a reactant.

"Of low monomer content", "low-monomer-content" and "low in monomeric diisocyanates" are used here synonymously in relation to the polyisocyanate composition.

Particularly useful results are seen in those embodiments where the polyisocyanate composition has a fraction of monomeric diisocyanates in the polyisocyanate composition of not more than 20 we/o, in particular not more than 15 wt % or not more than 10 wt %, based in each case on the weight of the polyisocyanate composition. In various embodiments of the invention, the polyisocyanate composition has a monomeric diisocyanates content of not more than 5 wt %, in other embodiments, not more than 2.0 wt %, and in still other embodiments, not more than 1.0 wt %, based in each case on the weight of the polyisocyanate composition. Particularly good results are seen where the polymer composition is substantially free from monomeric diisocyanates. "Substantially free", as used herein, means that the monomeric diisocyanates content is not more than 0.5 wt %, based on the weight of the polyisocyanate composition.

It is important that the polyisocyanate composition used is of low monomer content. In actual practice, this may be achieved by using, as polyisocyanate composition, oligomeric polyisocyanates in whose preparation the modification reaction itself is followed in each case by at least one further method step for the removal of the unreacted, excess monomeric diisocyanates. This removal of monomer may take place, in a particular, by methods that are known in the art, preferably by high-vacuum thin-film distillation or by extraction with suitable solvents that are inert towards isocyanate groups, examples being aliphatic or cycloaliphatic hydrocarbons such as pentane, hexane, heptane, cyclopentane or cyclohexane.

According to one embodiment of the invention, the polyisocyanate composition of the invention may be obtained by modification of monomeric diisocyanates, with subsequent removal of unreacted monomers.

The methods described in the art for the production of polyisocyanurate plastics very largely use monomeric diisocyanates as reactants—in other words, pure monomeric diisocyanates or monomer-rich polyisocyanate compositions are catalytically trimerized. In contrast to this, the inventive use or the "providing" of a low-monomer-content polyisocyanate composition which already contains oligomeric polyisocyanates leads, surprisingly, to a significantly lower volume contraction. The less exothermic nature of the reaction according to the invention makes it possible, moreover, to obtain highly reacted polyisocyanurate plastics.

It is preferred that no monomeric diisocyanate is used in the trimerization reaction of the invention. According to one particular embodiment of the invention, however, the polyisocyanate composition may comprise a monomeric extraneous diisocyanate. "Monomeric extraneous diisocyanate" in this context means that the diisocyanate in question differs from the monomeric diisocyanates used for preparing the oligomeric polyisocyanates contained in the polyisocyanate composition. The addition of monomeric extraneous diisocyanate may be advantageous to achieve specific technical effects, such as particular hardness, for example. Particularly useful results come about when the polyisocyanate composition has a monomeric extraneous diisocyanate fraction in the polyisocyanate composition of not more than 20 wt %, more particularly not more than 15 wt % or not more than 10 wt %, based in each case on the weight of the polyisocyanate composition. In some embodiments, the polyisocyanate composition has a monomeric extraneous diisocyanate content of not more than 5 wt %, in other embodiments, not more than 2.0 wt %, in yet other embodiments, not more than 1.0 wt %, based in each case on the weight of the polyisocyanate composition.

According to a particular embodiment of the method of the invention, the polyisocyanate composition may comprise monomeric monoisocyanates or monomeric isocyanates having an isocyanate functionality of greater than two, i.e. having more than two isocyanate groups per molecule. The addition of monomeric monoisocyanates or monomeric isocyanates having an isocyanate functionality of more than two has proved advantageous in order to influence the network density of the polyisocyanurate plastic. Particularly useful results come about when the polyisocyanate composition has a fraction of monomeric monoisocyanates or monomeric isocyanates having an isocyanate functionality of greater than two in the polyisocyanate composition of not more than 20 wt %, more particularly not more than 15 wt % or not more than 10 wt %, based in each case on the weight of the polyisocyanate composition. In some embodiments, the polyisocyanate composition preferably has a monomeric monoisocyanates content or a content of monomeric isocyanates having an isocyanate functionality of more than two of not more than 5 wt %, in other embodiments, not more than 2.0 wt %, and in still other embodiments, not more than 1.0 wt %, based in each case on the weight of the polyisocyanate composition. It is preferred that no monomeric monoisocyanate or monomeric isocyanate having an isocyanate functionality of greater than two is used in the trimerization reaction to prepare the polyisocyanurate useful in the invention.

The low-monomer-content polyisocyanate composition and the oligomeric polyisocyanates present therein are obtained customarily by modification of simple aliphatic, cycloaliphatic, araliphatic and/or aromatic monomeric diisocyanates or mixtures of such monomeric diisocyanates.

In accordance with the invention the oligomeric polyisocyanates may in particular have uretdione, isocyanurate, allophanate, biuret, iminooxadiazinedione and/or oxadiazinetrione structure. According to one embodiment of the invention, the oligomeric polyisocyanates have at least one of the following oligomeric structural types or mixtures thereof:

Uretdione  Isocyanurate
Allophanate  Biuret
iminooxadiazinedione  Oxadiazinetrione Surprisingly it has been found that it may be advantageous to use oligomeric polyisocyanates which represent a mixture of at least two oligomeric polyisocyanates, with the at least two oligomeric polyisocyanates differing in their structure. This structure may preferably be selected from the group consisting of uretdione, isocyanurate, allophanate, biuret, iminooxadiazinedione and oxadiazinetrione structure and mixtures thereof. Starting mixtures of this kind may lead to an influencing of the glass transition temperature (Tg) value, especially in comparison to trimerization reactions with oligomeric polyisocyanates of only one defined structure, and this influencing of the Tg value is advantageous for many applications.

In providing the polyisocyanurate useful in the invention, a polyisocyanate composition is preferred that consists of at least one oligomeric polyisocyanate with biuret, allophanate, isocyanurate, and/or iminooxadiazinedione structure, and mixtures thereof.

According to another embodiment, the polyisocyanate composition comprises only one individual defined oligomeric structure—for example, exclusively or very largely, isocyanurate structure. Generally speaking, however, the production procedure means that there are always a plurality of different oligomeric structures present alongside one another in the polyisocyanate composition.

For the purposes of the present invention, a polyisocyanate composition is regarded as a polyisocyanate composition of an individual defined oligomeric structure where there is an oligomeric structure selected from uretdione, isocyanurate, allophanate, biuret, iminooxadiazinedione and/or oxadiazinetrione structure to an extent of at least 50 mol %, preferably 60 mol %, more preferably 70 mol %, very preferably 80 mol %, more particularly 90 mol %, based in each case on the sum total of the oligomeric structures present from the group consisting of uretdione, isocyanurate, allophanate, biuret, iminooxadiazinedione and oxadiazinetrione structure in the polyisocyanate composition.

In various embodiments, a polyisocyanate composition of an individual defined oligomeric structure may be used, the oligomeric structure being selected from uretdione, isocyanurate, allophanate, biuret, iminooxadiazinedione and/or oxadiazinetrione structure and being present to an extent of at least 50 mol %, preferably 60 mol %, more preferably 70 mol %, very preferably 80 mol %, more particularly 90 mol %, based in each case on the sum total of the oligomeric structures present from the group consisting of uretdione, isocyanurate, allophanate, biuret, iminooxadiazinedione and oxadiazinetrione structure in the polyisocyanate composition.

According to a further embodiment, the oligomeric polyisocyanates are those having primarily isocyanurate structure, and being permitted to contain the aforementioned uretdione, allophanate, biuret, iminooxadiazinedione and/or oxadiazinetrione structure merely as by-products. Accordingly, one embodiment of the invention provides for the use of a polymer composition of an individual defined oligomeric structure, the oligomeric structure being an isocyanurate structure and being present to an extent of at least 50 mol %, preferably 60 mol %, more preferably 70 mol %, very preferably 80 mol %, most particularly 90 mol %, based in each case on the sum total of the oligomeric structures present from the group consisting of uretdione, isocyanurate, allophanate, biuret, iminooxadiazinedione and oxadiazinetrione structure in the polyisocyanate composition.

It is likewise possible in accordance with the invention to use oligomeric polyisocyanates which very largely have no isocyanurate structure, and comprise primarily at least one of the abovementioned uretdione, allophanate, biuret, iminooxadiazinedione and/or oxadiazinetrione structure types. According to various embodiments of the invention, the polyisocyanate composition comprises to an extent of at least 50 mol %, 60 mol %, 70 mol %, 80 mol %, or 90 mol %, based in each case on the sum total of the oligomeric structures present from the group consisting of uretdione, isocyanurate, allophanate, biuret, iminooxadiazinedione and oxadiazinetrione structure in the polyisocyanate composition, of oligomeric polyisocyanates which have a structure type selected from the group consisting of uretdione, allophanate, biuret, iminooxadiazinedione and/or oxadiazinetrione structure.

Other embodiments of the invention provide for the use of a low-isocyanurate-content polyisocyanate composition which, based on the sum total of the oligomeric structures present from the group consisting of uretdione, isocyanurate, allophanate, biuret, iminooxadiazinedione and oxadiazinetrione structure in the polyisocyanate composition, has not more than 50 mol %, not more than 40 mol %, not more than 30 mol %, not more than 20 mol %, 10 mol % or 5 mol % of isocyanurate structures. Yet other embodiments of the invention provide for the use of a polymer composition of an individual defined oligomeric structure type, the oligomeric structure type being selected from the group consisting of uretdione, allophanate, biuret, iminooxadiazinedione and/or oxadiazinetrione structure and this structure type being present to an extent of at least 50 mol %, 60 mol %, 70 mol %, 80 mol %, or 90 mol %, based on the sum total of the oligomeric structures present from the group consisting of uretdione, isocyanurate, allophanate, biuret, iminooxadiazinedione and oxadiazinetrione structure in the polyisocyanate composition.

The fractions of uretdione, isocyanurate, allophanate, biuret, iminooxadiazinedione and/or oxadiazinetrione structure in the polyisocyanate composition may be determined by means of NMR spectroscopy, for example. Here it is possible to use $^{13}$C NMR spectroscopy, preferably proton-decoupled, since the stated oligomeric structures yield characteristic signals.

Depending on the parent oligomeric structure type (uretdione, isocyanurate, allophanate, biuret, iminooxadiazinedione and/or oxadiazinetrione structure), the oligomeric polyisocyanate composition for use in the method of the invention, and/or the oligomeric polyisocyanates present in this composition, have/has, preferably, an (average) NCO functionality of 2.0 to 5.0, preferably of 2.3 to 4.5.

In various embodiments, practical results come about if the polyisocyanate composition for use in accordance with the invention has an isocyanate group content of 8.0 to 28.0 wt %. It has proved to be particularly useful if the polyisocyanate composition of the invention has an isocyanate group content of 14.0 to 25.0 wt %, based in each case on the weight of the polyisocyanate composition.

Preparation processes for the oligomeric polyisocyanates with uretdione, isocyanurate, allophanate, biuret, iminooxadiazinedione and/or oxadiazinetrione structure that are for use in accordance with the invention in the low-monomer-content polyisocyanate composition are described in, for example, *J. Prakt. Chem.* 336 (1994) 185-200, in GB1145952, GB1244416, U.S. Pat. Nos. 3,992,316, 3,996,223, 4,255,569, 4,837,359, 4,994,541, 5,064,960, 5,076,958, 4,960,848 and 5,914,383.

According to additional or alternative embodiments of the invention, the polyisocyanate composition useful in the invention comprises oligomeric polyisocyanates which have been obtained from monomeric diisocyanates, independently of the nature of the modification reaction used, with observance of a degree of oligomerization of 5% to 45%, 10% to 40%, or 15% to 30%. By "degree of oligomerization" herein is meant the percentage of the isocyanate groups originally present in the starting mixture that is consumed during the preparation procedure with formation of uretdione, isocyanurate, allophanate, biuret, iminooxadiazinedione and/or oxadiazinetrione structures.

Suitable polyisocyanates for preparing the polyisocyanate composition for use in the invention, and for preparing the oligomeric polyisocyanates present in said composition, are any desired polyisocyanates that are accessible in various ways, as for example by phosgenation in the liquid phase or gas phase or by a phosgene-free route, such as by thermal urethane cleavage. Particularly good results come about when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, such as, for example, 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanato-methyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi (cyclohexyl), 4,4'-diisocyanato-3,3'-dimethyl-1,1'-bi (cyclohexyl), 4,4'-diisocyanato-2,2',5,5'-tetramethyl-1,1'-bi (cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene, and any desired mixtures of such diisocyanates. Further diisocyanates likewise suitable are also found in, for example, *Justus Liebigs Annalen der Chemie volume* 562 (1949) pp. 75-136.

Suitable monomeric monoisocyanates which may be used optionally in the polyisocyanate composition are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- and/or 4-methylcyclohexyl isocyanate, or any desired mixtures of such monoisocyanates. An example of a monomeric isocyanate with an isocyanate functionality of more than two that may be added optionally to the polyisocyanate composition is 4-isocyanatomethyl-1,8-octane diisocyanate (triisocyanatononane; TIN).

In various embodiments of the invention, the polyisocyanate composition comprises not more than 30 wt %, not more than 20 wt %, not more than 15 wt %, not more than 10 wt %, not more than 5 wt % or not more than 1 wt %, based in each case on the weight of the polyisocyanate composition, of aromatic polyisocyanates. As used herein, "aromatic polyisocyanate" denotes a polyisocyanate which has at least one aromatically bonded isocyanate group. Aromatically bonded isocyanate groups are understood to be those isocyanate groups which are bonded to an aromatic hydrocarbon radical.

According to a preferred embodiment of the method of the invention, a polyisocyanate composition is used which has exclusively aliphatically and/or cycloaliphatically bonded isocyanate groups. By aliphatically and/or cycloaliphatically bonded isocyanate groups are meant isocyanate groups which are bonded to an aliphatic or cycloaliphatic hydrocarbon radical, respectively.

According to another embodiment of the method of the invention, a polyisocyanate composition is used which comprises or consists of one or more oligomeric polyisocyanates, the one or more oligomeric polyisocyanates having exclusively aliphatically and/or cycloaliphatically bonded isocyanate groups.

According to further embodiments of the invention, the polyisocyanate composition comprises to an extent of at least 70, 80, 85, 90, 95, 98 or 99 wt %, based in each case on the weight of the polyisocyanate composition, of polyisocyanates which have exclusively aliphatically and/or cycloaliphatically bonded isocyanate groups. Particularly good results have been observed with polyisocyanate compositions in which the oligomeric polyisocyanates have exclusively aliphatically and/or cycloaliphatically bonded isocyanate groups.

According to various embodiments of the invention, a polyisocyanate composition is used which comprises one or more oligomeric polyisocyanates, the one or more oligomeric polyisocyanates being constructed on the basis of 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

The polyisocyanurates useful in the invention are obtained by catalytic trimerization. "Catalytic" in the present context means in the presence of a suitable catalyst.

Suitable catalysts are in principle all compounds which accelerate the trimerization of isocyanate groups to isocyanurate structures. As the formation of isocyanurate, depending on the catalyst used, is often accompanied by secondary reactions, as for example dimerization to uretdione structures or trimerization with formation of iminooxadiazinediones (referred to as asymmetric trimers), and by allophatization reactions when urethane groups are present in the starting polyisocyanate, the term "trimerization" in the context of the present invention is intended, synonymously, to stand for these additionally proceeding reactions as well.

According to some embodiments, however, trimerization means that it is prominently cyclotrimerizations, of at least 50%, at least 60%, at least 70%, or at least 80%, of the isocyanate groups present in the polyisocyanate composition, to form isocyanurate structural units, that are catalyzed. Secondary reactions, however, especially those resulting in uretdione, allophanate, and/or iminooxadiazinedione structures, customarily occur and may even be utilized deliberately in order to exert advantageous influence over, for example, the Tg of the resulting polyisocyanurate plastic.

Suitable catalysts for the trimerization are, for example, simple tertiary amines, such as triethylamine, tributylamine, N,N-dimethylaniline, N-ethylpiperidine or N,N'-dimethylpiperazine, for example. Other suitable catalysts are the tertiary hydroxyalkylamines described in GB 2 221 465, such as triethanolamine, N-methyldiethanolamine, dimethylethanolamine, N-isopropyldiethanolamine and 1-(2-hydroxyethyl)pyrrolidine, for example, or the catalyst systems known from GB 2 222 161 that consist of mixtures of tertiary bicyclic amines, such as DBU, for example, with simple aliphatic alcohols of low molecular mass.

Trimerization catalysts useful in the invention that are likewise suitable are a multiplicity of different metal compounds. Suitability is possessed for example by the octoates and naphthenates of manganese, iron, cobalt, nickel, copper, zinc, zirconium, cerium or lead that are described as catalysts in DE-A 3 240 613, or by mixtures thereof with acetates of lithium, sodium, potassium, calcium or barium; the sodium and potassium salts of linear or branched alkane carboxylic acids with up to 10 C atoms that are known from U.S. Pat. No. 4,604,418, such as those salts of propionic acid, butyric acid, valeric acid, caproic acid, heptanoic acid, capric acid, pelargonic acid, capric acid and undecylic acid; the alkali metal or alkaline earth metal salts of aliphatic, cycloaliphatic or aromatic monocarboxylic and polycarboxylic acids having 2 to 20 C atoms that are known from EP-A 0 100 129, such as sodium benzoate or potassium benzoate, for example; the alkali metal phenoxides known from GB-PS 1 391 066 and GB-PS 1 386 399, such as sodium or potassium phenoxide, for example; the alkali metal and alkaline earth metal oxides, hydroxides, carbonates, alkoxides and phenoxides that are known from GB 809 809; alkali metal salts of enolizable compounds; and also metal salts of weak aliphatic or cycloaliphatic carboxylic acids, such as sodium methoxide, sodium acetate, potassium acetate, sodium acetoacetate, lead 2-ethylhexanoate and lead phthenate, for example; the basic alkali metal compounds complexed with crown ethers or polyether alcohols that are known from U.S. Pat. Nos. 4,487,928 and 4,379,905, such as complexed sodium or potassium carboxylates, for example; the pyrrolidone potassium salt known from U.S. Pat. No. 4,265,798; the monocyclic or polycyclic complex compounds of titanium, zirconium and/or hafnium that are known from application EP 13196508.9, such as zirconium tetra-n-butoxide, zirconium tetra-2-hexanoate and zirconium tetra-2-ethylhexylate, for example; and also tin compounds of the type described in *European Polymer Journal, Vol. 16*, 147-148 (1979) such as dibutyltin dichloride, diphenyltin dichloride, triphenylstannanol, tributyltin acetate, tributyltin oxide, tin octoate, dibutyl(dimethoxy)stannan and tributyltin imidazolate, for example.

Further trimerization catalysts suitable for the method of the invention are, for example, the quaternary ammonium hydroxides known from U.S. Pat. No. 3,487,080, EP-A 0 013 880 and U.S. Pat. No. 4,419,513, such as tetraethylammonium hydroxide, trimethylbenzyl-ammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water with 1,4-diazabicyclo[2.2.2]octane), the quaternary hydroxyalkylammonium hydroxides known from U.S. Pat. Nos. 4,288,586 and 4,324,879, such as N,N,N-trimethyl-N-(2-hydroxyethyl)ammonium hydroxide, the trialkylhydroxyalkyl-ammonium carboxylates that are known from U.S. Pat. No. 4,040,992, EP-A 0 671 426, U.S. Published Patent Application No. 2006/0155095 and U.S. Pat. No. 4,789,705, such as N,N,N-trimethyl-N-2-hydroxypropylammonium p-tert-butylbenzoate and N,N,N-trimethyl-N-2-hydroxypropylammonium 2-ethylhexanoate; the quaternary benzylammonium carboxylates known from U.S. Pat. No. 6,613,863, such as N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium-2-ethylhexanoate or N, N, N-tributyl-N-(4-methoxybenzyl)ammonium pivalate; the tetrasubstituted ammonium α-hydroxycarboxylates known from U.S. Pat. No. 8,119,799, such as tetramethylammonium lactate; the quaternary ammonium or phosphonium fluorides known from U.S. Pat. Nos. 4,960,848 and 5,013,838 and EP-A 0 443 167, such as N-methyl-N,N,N-trialkylammonium fluorides with $C_8$-$C_{10}$ alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride; the quaternary ammonium and phosphonium polyfluorides known from U.S. Pat. No. 5,914,383, EP-A 0 896 009 and U.S. Pat. No. 6,090,939, such as benzyltrimethylammonium hydrogen polyfluoride; the tetraalkylammonium alkylcarbonates which are known from U.S. Pat. No. 5,489,663 and are obtainable by reaction of tertiary amines with dialkyl carbonates, or betaine-structured quaternary-ammonioalkyl carbonates; the quaternary ammonium hydrogencarbonates known from U.S. Pat. No. 6,635,761, such as choline bicarbonate; the quaternary ammonium salts which are known from U.S. Pat. No. 4,499,253 and are obtainable from tertiary amines and phosphorous acid esters with alkylating effects, examples of such salts being reaction products of triethylamine, DABCO or N-methylmorpholine with dimethyl methanephosphonate; or the tetrasubstituted ammonium salts of lactanes that are known from U.S. Pat. No. 8,742,166, such as trioctylammonium caprolactamate or dodecyltrimethylammonium caprolactamate, for example.

Further trimerization catalysts suitable for the method of the invention are found for example in J. H. Saunders and K. C. Frisch, *Polyurethanes Chemistry and Technology*, p. 94 ff. (1962) and in the literature cited therein.

In various embodiments of the invention, the catalysts may be used both individually and in the form of any desired mixtures with one another.

Suitable catalysts are metal compounds of the type specified above, especially carboxylates and alkoxides of alkali metals, alkaline earth metals or zirconium, and also organotin compounds of the type stated.

Particularly preferred trimerization catalysts are sodium salts and potassium salts of aliphatic carboxylic acids having 2 to 20 C atoms, and also tin compounds with aliphatic substitution:

Especially preferred trimerization catalysts for use in the invention are potassium acetate, tin octoate, potassium octoate, tributyltin oxide, methylcholine and benzyltrimethylammonium hydroxide (TRITON B).

In various embodiments of the method of the invention, the trimerization catalyst is employed at a concentration, based on the amount of polyisocyanate composition used, of 0.0005 to 5.0 wt %, in other embodiments, of 0.0010 to 2.0 wt % and in still other embodiments, of 0.0015 to 1.0 wt %.

The trimerization catalysts employed in the invention are of sufficient solubility in the polyisocyanate composition at the quantities required for initiating the oligomerization reaction. The catalyst is preferably added to the polyisocyanate composition in bulk. Optionally, however, to improve their ease of incorporation, the catalysts may also be used in solution in a suitable organic solvent. The degree of dilution of the catalyst solutions in this case may be selected freely within a very broad range. Such catalyst solutions are usually catalytically active from a concentration of about 0.01 wt %.

Examples of suitable catalyst solvents are solvents which are inert towards isocyanate groups, such as, for example, hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, and also solvents such as N-methylpyrrolidone and N-methylcaprolactam, 1,2-propylene carbonate, methylene chloride, dimethyl sulphoxide, triethyl phosphate, or any desired mixtures of such solvents.

Where catalyst solvents are employed, preference is given to using catalyst solvents which carry groups reactive towards isocyanates and which can be incorporated into the polyisocyanurate plastic. Examples of such solvents are mono- or polyhydric simple alcohols, such as methanol, ethanol, n-propanol, isopropanol, n-butanol, n-hexanol, 2-ethyl-1-hexanol, ethylene glycol, propylene glycol, the isomeric butanediols, 2-ethyl-1,3-hexanediol or glycerol; ether alcohols, such as 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid, relatively high molecular mass polyethylene glycols, polypropylene glycols, mixed polyethylene/polypropylene glycols and also their monoalkyl ethers; ester alcohols, such as ethylene glycol monoacetate, propylene glycol monolaurate, glycerol monoacetate and diacetate, glycerol monobutyrate or 2,2,4-trimethyl-1,3-pentanediol monoisobutyrate; unsaturated alcohols such as allyl alcohol, 1,1-dimethylallyl alcohol or oleyl alcohol; araliphatic alcohols such as benzyl alcohol; N-monosubstituted amides such as N-methylformamide, N-methylacetamide, cyanacetamide or 2-pyrrolidinone; or any desired mixtures of such solvents.

In the course of the production of the polyisocyanurate plastics useful in the present invention, it is possible optionally for customary auxiliaries and adjuvants to be used, such as, for example, customary fillers, UV stabilizers, antioxidants, mold release agents, water scavengers, slip additives, defoamers, flow control agents, rheological additives, flame retardants and/or pigments. Apart from fillers and flame retardants, these auxiliaries and adjuvants are present in various embodiments in an amount of less than 10 wt %, less than 5 wt %, or up to 3 wt %, based on the polyisocyanate composition, in the polyisocyanurate plastic. In various embodiments, the flame retardants may be present in amounts of not more than 70 wt %, not more than 50 wt %, or not more than 30 wt %, calculated as total amount of flame retardants used, based on the polyisocyanate composition, in the polyisocyanurate plastic.

Suitable fillers are, for example, $AlOH_3$, $CaCO_3$, metal pigments such as $TiO_2$, and other known customary fillers. In various embodiments, these fillers may be added in amounts of not more than 70 wt %, not more than 50 wt %, or not more than 30 wt %, calculated as total amount of fillers used, based on the polyisocyanate composition.

Suitable antioxidants are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. As and when required, they may be used both individually and in any desired combinations with one another.

In various embodiments, these antioxidants are used in amounts of 0.01 to 3.0 wt %, or 0.02 to 2.0 wt %, calculated as total amount of antioxidants used, based on the polyisocyanate composition.

Apart from the small amounts of any catalyst solvents to be used, the method of the invention can be carried out in solvent-free form. However, especially in the case of the inventive use for the production of coatings or sheets, the polyisocyanate component, in order to reduce the processing viscosity, may optionally also be diluted with organic solvents. Solvents suitable for this purpose are, for example, the catalyst solvents already described above that are inert towards isocyanate groups.

According to one embodiment of the method of the invention, the polyisocyanate composition described, optionally under inert gas, such as nitrogen, for example, and optionally with accompanying use of the aforementioned solvents and also auxiliaries and adjuvants, is admixed with a trimerization catalyst or with a mixture of different trimerization catalysts, and these components are mixed in homogeneously by means of a suitable mixing assembly. The addition of catalyst and of the solvent for optional use, and also of auxiliaries and adjuvants, may take place in any order, in succession or in a mixture, in the amounts reported above, in general at a temperature of 32° F. to 212° F. (0° C. to 100° C.), preferably of 59° F. to 176° F. (15° C. to 80° C.), more preferably of 68° F. to 140° F. (20° C. to 60° C.).

In various embodiments, the trimerization reaction may be initiated by heating, with the optimum reaction temperature being dependent on the particular catalyst selected and being from 68° F. to 482° F. (20° C. to 250° C.), or from 104° F. to 392° F. (40° C. to 200° C.), or from 140° F. to 302° F. (60° C. to 150° C.). Any reference here to "reaction temperature" therefore means the ambient temperature, including the down-hole temperature.

Depending on the catalyst selected and on the reaction temperature selected, the trimerization reaction is very largely at an end after a period of less than one minute up to several hours, or only after a number of days, as defined below.

The polyisocyanurate plastics of the invention are preferably highly reacted polyisocyanurates, meaning those for which the trimerization reaction to form polyisocyanurate structures is very largely at an end. "Very largely at an end" may be seen in the sense of the present invention to refer to a trimerization reaction to form polyisocyanurate structures if at least 80%, preferably at least 90%, more preferably at least 95% of the free isocyanate groups originally present in the polyisocyanate composition A) have been consumed by reaction. Expressed alternatively, preferably only not more than 20%, not more than 10%, more preferably not more than 5% of the isocyanate groups originally present in the polyisocyanate composition are still present in the polyisocyanurate plastic of the invention. This can be achieved by continuing the catalytic trimerization, in the method of the invention, at least to a degree of conversion at which only, for example, 20% at most of the isocyanate groups originally present in the polyisocyanate composition are still present, thus giving a highly reacted polyisocyanurate. The percentage of isocyanate groups still present may be determined by a comparison of the amount of isocyanate groups in wt % in the original polyisocyanate composition to the amount of isocyanate groups in wt % in the reaction product, by means, for example, of an aforementioned comparison of the intensity of the isocyanate band at about 2270 $cm^{-1}$ by means of IR spectroscopy.

The methods in various embodiments of the invention afford polyisocyanurate plastics which depending on the nature of the starting polyisocyanate employed, includes not only isocyanurate structures but also, optionally, further oligomeric structures, and which are distinguished by outstanding heat resistances.

The embodiments of the present invention make it possible, through suitable selection of starting polyisocyanates having different oligomeric structures, to synthesize polyisocyanurate plastics having different properties, for example different degrees of hardness, mechanical properties or glass transition temperatures for use in down hole applications.

In contrast to polyisocyanurate plastics produced from monomeric diisocyanates, such as from monomeric HDI, for example, the products in certain embodiments of the invention are notable for a significantly reduced volume contraction during curing, and for that reason are highly suitable for the production of stable plugs at down-hole temperatures of between 250° F. (121° C.) and 300° F. (149° C.).

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. The following materials were used in the Examples described herein;

Isocyanate A a solvent-free polyfunctional aliphatic polyisocyanate resin based on hexamethylene diisocyanate (HDI); low-viscosity HDI trimer; NCO content of 23.0%±0.5; viscosity of 1,200±300 mPa·s @ 23° C., available from Bayer MaterialScience as DESMODUR N 3600;

Isocyanate B a solvent-free aliphatic polyisocyanate resin based on hexamethylene diisocyanate (HDI); HDI trimer available from Bayer MaterialScience as DESMODUR NZ 1;

Isocyanate C a solvent-free, low viscosity, aliphatic prepolymer based on hexamethylene-1,6-diisocyanate (HDI) having an NCO content of 6±0.5%, and a viscosity of 2,500±500 mPa·s @ 23° C. available from Bayer MaterialScience as DESMODUR XP 2599;

Isocyanate D a low-viscosity solvent-free aliphatic polyisocyanate (HDI uretdione) having an NCO group content of about 22.7 wt % and a viscosity of about 90 mPa·s @ 23° C. available from Bayer MaterialScience as DESMODUR XP 2730;

Isocyanate E a solvent-free aliphatic polyisocyanate having an NCO content of 21±0.5%, and a viscosity of 3,000±750 mPa·s @ 23° C. available from Bayer MaterialScience as DESMODUR XP 2838;

Isocyanate F a polyfunctional aliphatic isocyanate resin based on hexamethylene diisocyanate (HDI) having an NCO content of 19.5±0.5% and a viscosity of 450±150 mPa·s @ 25° C. available from Bayer MaterialScience as DESMODUR XP-2580;

Isocyanate G an aliphatic polyisocyanate (IPDI trimer) having an NCO content of 11.9±0.4% and a viscosity of 600±200 mPa·s @ 23° C. available from Bayer MaterialScience as DESMODUR Z-4470 BA;

Defoamer A a fluorine based defoamer available as FC 983;

Defoamer B defoamer and deaerator available from Evonik Resource Efficiency GmbH as TEGO AIREX 990;

Catalyst A a 70% by weight solution of potassium octoate in diethylene glycol, available from Air Products as DABCO K 15 (in a 10% solution of Solvent);

Catalyst B a 70% by weight solution of potassium octoate in diethylene glycol, available from Air Products as DABCO K-15 Catalyst;

Catalyst C 1,1,1,3,3,3-hexamethyldisilazane;

Catalyst D a stannous octoate catalyst, available from Air Products as DABCO T-9 Catalyst;

Catalyst E a stannous octoate catalyst, available from Air Products as DABCO T-9 (in a 10% solution of Solvent);

Catalyst F benzyltrimethylammonium hydroxide available as TRITON B;

Catalyst retarder Octanoic acid, 99%;

Inhibitor Benzoyl chloride;

Plasticizer 2,2,4-trimethylpentanediol diisobutyrate available as TXIB; and

Solvent n-Butyl acetate.

Examples 1-37

Compositions 1-37 were prepared by mixing the components in the amounts listed in Table 1 (amounts are normalized to 100 by weight).

The compositions were evaluated for gel time as follows: the Gel time was determined by using a GARDCO GT-SHP "Hot Pot" Gel Timer. 100 grams of the composition was poured into an aluminum cup and placed into the "hot pot" of the gel timer that had already been stable at the cure temperature. The Gel Timer had a motor that rotated a stirrer that was inserted in the composition. As gelation cured, drag eventually exceeded torque and the motor stalled. The time at which the motor stalled is the reported Gel time in Tables I—below.

TABLE I

|  | Ex. 1 | Ex. 2 | Ex. 3 | Ex. 4 | Ex. 5 |
|---|---|---|---|---|---|
| Isocyanate A |  |  |  |  |  |
| Isocyanate B |  |  |  |  |  |
| Isocyanate C | 39.79 | 39.6 | 39.41 | 39.41 | 39.76 |
| Isocyanate D |  |  |  |  |  |
| Isocyanate E |  |  |  |  |  |
| Isocyanate F | 59.69 | 59.41 | 59.11 | 59.11 | 59.64 |
| Isocyanate G |  |  |  |  |  |
| Defoamer A |  |  |  |  |  |
| Defoamer B | 0.5 | 0.5 | 0.49 | 0.49 | 0.5 |
| Catalyst A |  |  |  |  |  |
| Catalyst B |  |  |  |  |  |
| Catalyst retarder |  |  |  |  |  |
| Catalyst C |  |  |  | 0.99 | 0.1 |
| Inhibitor |  |  |  |  |  |
| Catalyst D |  |  | 0.1 |  |  |
| Catalyst E |  | 0.5 |  |  |  |
| Catalyst F | 0.02 |  |  |  |  |
| Plasticizer |  |  | 0.89 |  |  |
| Formulation Results |  |  |  |  |  |
| PVC | 0 | 0 | 0 | 0 | 0 |
| NCO:OH | 0 | 0 | 0 | 0 | 0 |
| Weight Solids | 99.99 | 99.55 | 100 | 100 | 100 |
| P/B | 0 | 0 | 0 | 0 | 0 |
| Volume Solids | 99.98 | 99.45 | 100 | 100 | 100 |
| Wt/Gal | 9.04 | 9.03 | 9.03 | 9.13 | 9.05 |
| VOC | 0 | 0.04 | 0 | 0 | 0 |
| Curing | None | None | None | None | None |
| Gel Time (min.) | 1,000 | 1,000 | 183 | 1,000 | 1,000 |
| Notes | No gel @ 300° F. (149° C.) | No gel @ 300° F. (149° C.) | Very soft @ 300° F. (149° C.) | No gel @ 300° F. (149° C.) | No gel @ 300° F. (149° C.) |

As can be appreciated by reference to Table I, the mixtures of Ex. 1 catalyzed by 0.1% benzyltrimethylammonium hydroxide and Ex. 2, catalyzed by 0.05% stannous octoate (10% in n-butyl acetate), showed no gel formation after 1,000 minutes at 300° F. (149° C.). The mixture of Ex. 3, catalyzed by 0.1% stannous octoate (10% in n-butyl acetate), showed a very soft gel formation after 183 minutes at 300° F. (149° C.). The mixture of Ex. 4, catalyzed by 1% hexamethyl disilazane, showed no gel formation after 1,000 minutes at 300° F. (149° C.) as was the case in Ex. 5, catalyzed by 0.1% hexamethyl disilazane.

TABLE II

|  | Ex. 6 | Ex. 7 | Ex. 8 | Ex. 9 | Ex. 10 |
| --- | --- | --- | --- | --- | --- |
| Isocyanate A |  |  |  |  |  |
| Isocyanate B |  |  |  |  |  |
| Isocyanate C | 39.75 |  |  |  |  |
| Isocyanate D |  |  |  |  |  |
| Isocyanate E |  |  |  |  |  |
| Isocyanate F | 59.63 | 99.44 | 99.49 | 99.48 | 99.11 |
| Isocyanate G |  |  |  |  |  |
| Defoamer A |  |  |  |  |  |
| Defoamer B | 0.5 | 0.5 | 0.5 | 0.5 | 0.5 |
| Catalyst A |  |  |  |  | 0.4 |
| Catalyst B | 0.12 | 0.07 | 0.01 | 0.03 |  |
| Catalyst retarder |  |  |  |  |  |
| Catalyst C |  |  |  |  |  |
| Inhibitor |  |  |  |  |  |
| Catalyst D |  |  |  |  |  |
| Catalyst E |  |  |  |  |  |
| Catalyst F |  |  |  |  |  |
| Plasticizer |  |  |  |  |  |
| Formulation |  |  |  |  |  |
| Results |  |  |  |  |  |
| PVC | 0 | 0 | 0 | 0 | 0 |
| NCO:OH | 0 | 0 | 0 | 0 | 0 |
| Weight Solids | 99.97 | 99.98 | 100 | 99.99 | 99.63 |
| P/B | 0 | 0 | 0 | 0 | 0 |
| Volume Solids | 99.97 | 99.98 | 100 | 99.99 | 99.54 |
| Wt/Gal | 9.04 | 9.29 | 9.29 | 9.29 | 9.28 |
| VOC | 0 | 0 | 0 | 0 | 0.03 |
| Curing | None | None | None | None | None |
| Gel Time (min.) | 19 | 20 | 1,000 | 1,000 | 428 |
| Notes | Hard gel @ 300° F. (149° C.) | Hard gel @ 300° F. (149° C.) | No gel @ 300° F. (149° C.) | No gel- @ 300° F. (149° C.) | No gel @ 300° F. (149° C.) |

The mixture of Ex. 6, catalyzed by 0.09% potassium octoate, showed the formation of a hard gel after 19 minutes at 300° (149° C.). Similarly, a polyfunctional aliphatic isocyanate resin based on hexamethylene diisocyanate (HDI) in Ex. 7 catalyzed by 0.05% potassium octoate, showed the formation of a hard gel after 20 minutes at 300° F. (149° C.). The same isocyanate in Examples 8 and 9, catalyzed by 0.01% and 0.02% potassium octoate respectively, showed no gel formation after 1,000 minutes at 300° F. (149° C.). Additionally, the same polyfunctional aliphatic isocyanate in Ex. 10, catalyzed by 0.03% potassium octoate, showed no gel formation after 428 minutes at 300° F. (149° C.).

TABLE III

|  | Ex. 11 | Ex. 12 | Ex. 13 | Ex. 14 | Ex. 15 |
| --- | --- | --- | --- | --- | --- |
| Isocyanate A |  |  |  |  |  |
| Isocyanate B |  |  |  |  |  |
| Isocyanate C |  |  |  |  |  |
| Isocyanate D |  |  |  |  |  |
| Isocyanate E |  |  |  |  |  |
| Isocyanate F | 98.85 | 98.98 | 98.75 | 98.84 | 98.19 |
| Isocyanate G |  |  |  |  |  |
| Defoamer A |  |  |  |  |  |
| Defoamer B | 0.49 | 0.49 | 0.49 | 0.49 | 0.49 |
| Catalyst A | 0.66 | 0.53 | 0.66 | 0.66 | 1.31 |
| Catalyst B |  |  |  |  |  |
| Catalyst retarder |  |  | 0.1 | 0.01 | 0.01 |
| Catalyst C |  |  |  |  |  |
| Inhibitor |  |  |  |  |  |
| Catalyst D |  |  |  |  |  |
| Catalyst E |  |  |  |  |  |
| Catalyst F |  |  |  |  |  |
| Plasticizer |  |  |  |  |  |
| Formulation |  |  |  |  |  |
| Results |  |  |  |  |  |
| PVC | 0 | 0 | 0 | 0 | 0 |
| NCO:OH | 0 | 0 | 0 | 0 | 0 |
| Weight Solids | 99.39 | 99.51 | 99.39 | 99.39 | 98.79 |
| P/B | 0 | 0 | 0 | 0 | 0 |
| Volume Solids | 99.24 | 99.39 | 99.24 | 99.24 | 98.49 |
| Wt/Gal | 9.28 | 9.28 | 9.27 | 9.28 | 9.26 |
| VOC | 0.06 | 0.05 | 0.06 | 0.06 | 0.11 |
| Curing | None | None | None | None | None |
| Gel Time (min.) | 14 | 333 | 1,538 | 304 | 18 |
| Notes | Gelled @ 129° C. (265° F.) | No gel @ 300° F. (149° C.) | Foamy gel hard | Soft gel | Hard gel |

Although the polyfunctional aliphatic isocyanate mixture catalyzed in Ex. 11 by 0.05% potassium octoate as solution (in 10% n-butyl acetate), gelled in 14 minutes upon reaching 265° F. (129° C.), in Ex. 12, the same isocyanate mixture was catalyzed by a 0.04% potassium octoate as solution (in 10% n-butyl acetate), showed no gel formation after 333 minutes at 300° F. (149° C.). In Ex. 13, the same isocyanate mixture was catalyzed by a 0.05% potassium octoate as solution with 0.1% octanoic acid (to retard catalysis) and showed the formation of a foamy gel which was hard after 1538 minutes at 300° F. (149° C.). In Ex. 14 catalyzed by 0.05% potassium octoate as solution with 0.01% octanoic acid (approximately 20% excess acid on salt), the same isocyanate mixture formed a soft gel after 304 minutes. The same isocyanate mixture is Ex. 15 catalyzed by 0.1% potassium octoate as solution with 0.01% octanoic acid (approximately 10% excess acid on salt) showed formation of a hard gel after 18 minutes.

TABLE IV

|  | Ex. 16 | Ex. 17 | Ex. 18 | Ex. 19 | Ex. 20 |
| --- | --- | --- | --- | --- | --- |
| Isocyanate A |  |  |  |  |  |
| Isocyanate B |  |  |  |  |  |
| Isocyanate C |  |  |  |  |  |
| Isocyanate D |  |  |  |  |  |
| Isocyanate E |  |  |  |  |  |
| Isocyanate F | 98.15 | 98.18 | 98.17 | 97.8 | 98.15 |
| Isocyanate G |  |  |  |  |  |
| Defoamer A |  | 0.49 | 0.49 | 0.49 | 0.49 |
| Defoamer B | 0.49 |  |  |  |  |
| Catalyst A | 1.31 | 1.31 | 1.31 | 1.7 | 1.31 |
| Catalyst B |  |  |  |  |  |
| Catalyst retarder | 0.05 | 0.02 | 0.03 |  |  |
| Catalyst C |  |  |  |  |  |
| Inhibitor |  |  |  | 0.02 | 0.05 |
| Catalyst D |  |  |  |  |  |
| Catalyst E |  |  |  |  |  |
| Catalyst F |  |  |  |  |  |

TABLE IV-continued

|  | Ex. 16 | Ex. 17 | Ex. 18 | Ex. 19 | Ex. 20 |
|---|---|---|---|---|---|
| Plasticizer |  |  |  |  |  |
| Formulation Results |  |  |  |  |  |
| PVC | 0 | 0 | 0 | 0 | 0 |
| NCO:OH | 0 | 0 | 0 | 0 | 0 |
| Weight Solids | 98.79 | 98.79 | 98.79 | 98.43 | 98.79 |
| P/B | 0 | 0 | 0 | 0 | 0 |
| Volume Solids | 98.49 | 98.49 | 98.49 | 98.04 | 98.49 |
| Wt/Gal | 9.26 | 9.27 | 9.27 | 9.26 | 9.27 |
| VOC | 0.11 | 0.11 | 0.11 | 0.15 | 0.11 |
| Curing | None | None | None | None | None |
| Gel Time (min.) | 408 | 18 | 14 | 15 | 375 |
| Notes | No gel @ 300° F. (149° C.) | Gelled before reaching 300° F. (149° C.) | Hard gel | Hard gel | No gel |

The mixture in Ex. 16 catalyzed by 0.1% potassium octoate as solution with 0.05% octanoic acid (approximately 50% excess acid on salt), showed no gel formation after 408 minutes at 300° F. (149° C.). In Ex. 17 catalyzed by 0.1% potassium octoate as solution with 0.02% octanoic acid (approximately 20% excess acid on salt), the mixture gelled before reaching 300° F. (149° C.) at 18 minutes. The mixture in Ex. 18 catalyzed by 0.1% potassium octoate as solution with 0.03% octanoic acid (approximately 30% excess acid on salt), formed a hard gel at 14 minutes. In Ex. 19 catalyzed by 0.13% potassium octoate as solution with 0.02% benzoyl chloride, the mixture formed a hard gel after 15 minutes. Ex. 20 catalyzed by 0.10% potassium octoate as solution with 0.05% benzoyl chloride showed no gel formation after 375 minutes at 300° F. (149° C.).

TABLE V

|  | Ex. 21 | Ex. 22 | Ex. 23 | Ex. 24 | Ex. 25 |
|---|---|---|---|---|---|
| Isocyanate A |  |  | 99.63 |  |  |
| Isocyanate B |  |  |  |  |  |
| Isocyanate C |  |  |  |  |  |
| Isocyanate D |  |  |  |  |  |
| Isocyanate E |  |  |  | 99.63 | 49.82 |
| Isocyanate F | 98.17 | 99.63 |  |  | 49.82 |
| Isocyanate G |  |  |  |  |  |
| Defoamer A | 0.49 | 0.1 | 0.1 | 0.1 | 0.1 |
| Defoamer B |  |  |  |  |  |
| Catalyst A | 1.31 |  |  |  |  |
| Catalyst B |  | 0.27 | 0.27 | 0.27 | 0.27 |
| Catalyst retarder |  |  |  |  |  |
| Catalyst C Inhibitor | 0.03 |  |  |  |  |
| Catalyst D |  |  |  |  |  |
| Catalyst E |  |  |  |  |  |
| Catalyst F |  |  |  |  |  |
| Plasticizer |  |  |  |  |  |
| Formulation Results |  |  |  |  |  |
| PVC | 0 | 0 | 0 | 0 | 0 |
| NCO:OH | 0 | 0 | 0 | 0 | 0 |
| Weight Solids | 98.79 | 99.93 | 99.93 | 99.93 | 99.93 |
| P/B | 0 | 0 | 0 | 0 | 0 |
| Volume Solids | 98.49 | 99.93 | 99.93 | 0.32 | 50.91 |
| Wt/Gal | 9.27 | 9.3 | 9.68 | 9.6 | 9.45 |
| VOC | 0.11 | 0.01 | 0.01 | 0.01 | 0.01 |
| Curing | None |  |  |  |  |
| Gel Time (min.) | 138 |  |  |  |  |

TABLE V-continued

|  | Ex. 21 | Ex. 22 | Ex. 23 | Ex. 24 | Ex. 25 |
|---|---|---|---|---|---|
| Notes | Soft gel not strong enough for use |  |  |  |  |

In Ex. 21 the same polyfunctional aliphatic isocyanate catalyzed by 0.1% potassium octoate as solution with 0.03% benzoyl chloride formed a soft gel (which would not be strong enough for use) after 138 minutes. Examples 22 to 25 varied the isocyanate with the same catalyst (0.2% potassium octoate as solution).

TABLE VI

|  | Ex. 26 | Ex. 27 | Ex. 28 | Ex. 29 | Ex. 30 |
|---|---|---|---|---|---|
| Isocyanate A |  |  |  |  |  |
| Isocyanate B |  |  |  |  |  |
| Isocyanate C |  |  |  |  |  |
| Isocyanate D |  |  |  |  | 70.96 |
| Isocyanate E |  |  |  |  |  |
| Isocyanate F | 98.59 | 99.04 | 96.93 | 96 |  |
| Isocyanate G |  |  |  |  | 25.34 |
| Defoamer A | 0.49 | 0.5 | 0.48 | 0.48 | 0.44 |
| Defoamer B |  |  |  |  |  |
| Catalyst A |  |  |  |  |  |
| Catalyst B | 0.53 | 0.26 | 0.65 | 0.64 | 0.59 |
| Catalyst retarder | 0.39 | 0.2 | 1.94 | 2.88 | 2.66 |
| Catalyst C Inhibitor |  |  |  |  |  |
| Catalyst D |  |  |  |  |  |
| Catalyst E |  |  |  |  |  |
| Catalyst F |  |  |  |  |  |
| Plasticizer |  |  |  |  |  |
| Formulation Results |  |  |  |  |  |
| PVC | 0 | 0 | 0 | 0 | 0 |
| NCO:OH | 0 | 0 | 0 | 0 | 0 |
| Weight Solids | 99.87 | 99.93 | 99.84 | 99.84 | 92.25 |
| P/B | 0 | 0 | 0 | 0 | 0 |
| Volume Solids | 99.87 | 99.93 | 99.84 | 99.84 | 90.27 |
| Wt/Gal | 9.29 | 9.29 | 9.26 | 9.24 | 9.27 |
| VOC | 0.01 | 0.01 | 0.01 | 0.01 | 0.72 |
| Curing | None | None | None | None | None |
| Gel Time (min.) | 32 | 42 | 98 | 159 | 107 |
| Notes | Hard gel @ 300° F. (149° C.) | Hard gel @ 300° F. (149° C.) | Hard gel @ 300° F. (149° C.) | Hard gel @ 300° F. (149° C.) | Foamy gel @ 300° F. (149° C.) |

Examples 26 to 37 explored the use of 99% octanoic acid as a catalyst retarder. Standard trimerization catalysts like tertiary amines and their salts are temperature sensitive and become deactivated at down-hole temperatures. Metal salts such as potassium octoate are active at these temperatures. A carboxylic acid acts as a retarder for the trimerization reaction so that the needed delayed reaction initiation can be achieved. Without wishing to be bound to any particular theory, the present inventors believe the addition of the carboxylic acid interferes with the trimerization reaction until the isocyanate reacts with it to create an amide. At that point, the catalyst can promote the trimerization. Thus, there is a balance of catalyst and acid amounts that can be used to stabilize the reaction at various temperatures above 250° F. (121° C.). The aliphatic isocyanate/acid reaction does not occur effectively below 250° F. (121° C.).

TABLE VII

| | Ex. 31 | Ex. 32 | Ex. 33 | Ex. 34 | Ex. 35 |
|---|---|---|---|---|---|
| Isocyanate A | | | | | |
| Isocyanate B | 96 | | | | |
| Isocyanate C | | | | | |
| Isocyanate D | | | | | |
| Isocyanate E | | 99.24 | | | |
| Isocyanate F | | | 93.1 | 98.36 | 97.88 |
| Isocyanate G | | | | | |
| Defoamer A | 0.48 | 0.5 | 0.47 | 0.49 | 0.49 |
| Defoamer B | | | | | |
| Catalyst A | | | 6.21 | | |
| Catalyst B | 0.64 | 0.26 | | 0.66 | 0.65 |
| Catalyst retarder | 2.88 | | 0.23 | 0.49 | 0.98 |
| Catalyst C Inhibitor | | | | | |
| Catalyst D | | | | | |
| Catalyst E | | | | | |
| Catalyst F | | | | | |
| Plasticizer | | | | | |
| Formulation Results | | | | | |
| PVC | 0 | 0 | 0 | 0 | 0 |
| NCO:OH | 0 | 0 | 0 | 0 | 0 |
| Weight Solids | 99.84 | 99.93 | 94.26 | 99.84 | 99.84 |
| P/B | 0 | 0 | 0 | 0 | 0 |
| Volume Solids | 99.84 | 0.77 | 92.9 | 99.84 | 99.84 |
| Wt/Gal | 9.6 | 9.59 | 9.16 | 9.29 | 9.28 |
| VOC | 0.02 | 0.01 | 0.53 | 0.02 | 0.02 |
| Curing | None | None | None | None | None |
| Gel Time (min.) | 999 | 35 | 15 | 48 | 56 |
| Notes | No gel @ 300° F. (149° C.) | Hard gel @ 300° F. (149° C.) | Hard gel @ 300° F. (149° C.) | Hard gel @ 300° F. (149° C.) | Hard gel @ 300° F. (149° C.) |

TABLE VIII

| | Ex. 36 | Ex. 37 |
|---|---|---|
| Isocyanate A | | |
| Isocyanate B | | |
| Isocyanate C | | |
| Isocyanate D | | |
| Isocyanate E | | |
| Isocyanate F | 95.09 | 96.93 |
| Isocyanate G | | |
| Defoamer A | 0.48 | 0.48 |
| Defoamer B | | |
| Catalyst A | | |
| Catalyst B | 0.63 | 0.65 |
| Catalyst retarder | 3.8 | 1.94 |
| Catalyst C Inhibitor | | |
| Catalyst D | | |
| Catalyst E | | |
| Catalyst F | | |
| Plasticizer | | |
| Formulation Results | | |
| PVC | 0 | 0 |
| NCO:OH | 0 | 0 |
| Weight Solids | 99.84 | 99.84 |
| P/B | 0 | 0 |
| Volume Solids | 99.84 | 99.84 |
| Wt/Gal | 9.22 | 9.26 |
| VOC | 0.01 | 0.01 |
| Curing | None | None |
| Gel Time (min.) | 193 | 66 |
| Notes | Hard gel @ 300° F. (149° C.) | Soft gel @ 300° F. (149° C.) |

Figure 1:
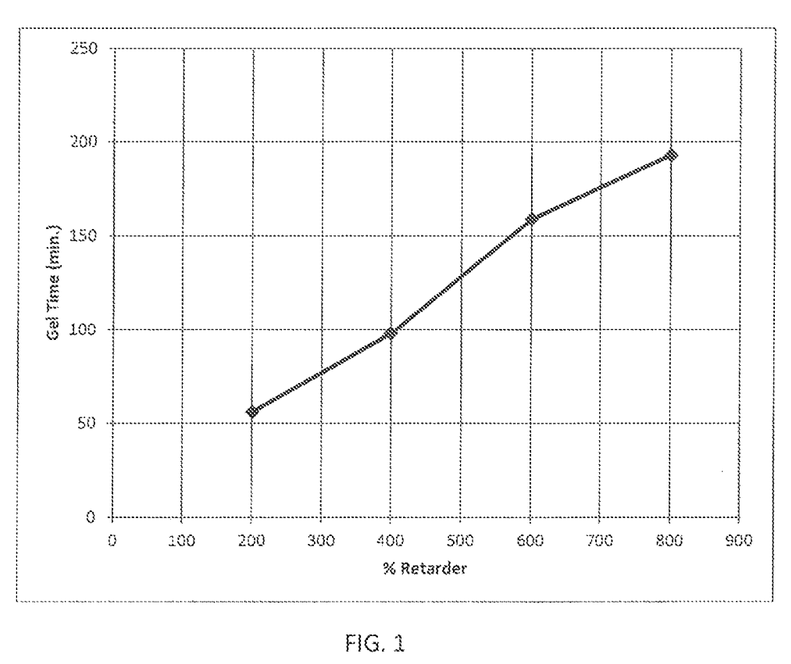
FIG. 1 shows a graph of gel time vs. percent retarder for 0.5% catalyst at 300° F. (149° C.) and 1 atm pressure.
Figure 2:
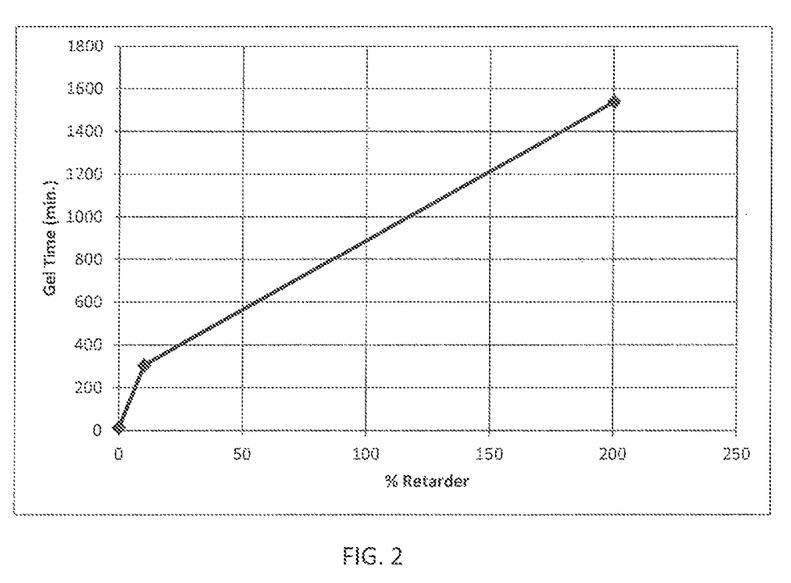
FIG. 2 shows a graph of gel time vs. percent retarder for 0.05% catalyst at 300° F. (149° C.)
Figure 3:
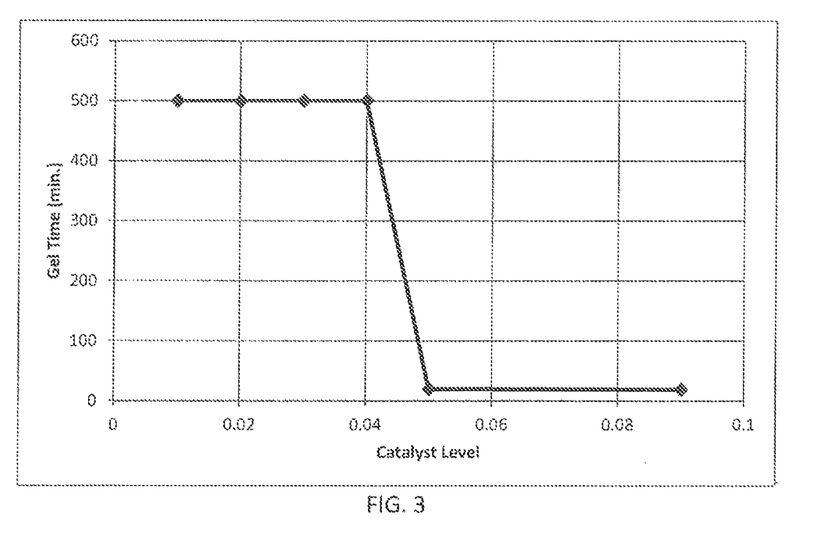
FIG. 3 illustrates a graph of gel time vs. catalyst level of potassium octoate.

FIG. 1 shows a graph of gel time vs. percent retarder for 0.5% catalyst at 300° F. (149° C.) and 0.1 atm pressure. FIG. 2 shows a graph of gel time vs. percent retarder for 0.05% catalyst at 300° F. (149° C.). FIG. 3 illustrates a graph of gel time vs. catalyst level of potassium octoate.

TABLE IX

| Example | % Catalyst | % Retarder | Gel time | % retarder on catalyst |
|---|---|---|---|---|
| Ex. 12 | 0.04 | | no gel | |
| Ex. 11 | 0.05 | | 14 | |
| Ex. 13 | 0.05 | 0.1 | 1538 | 200 |
| Ex. 14 | 0.05 | 0.01 | 304 | 10 |
| Ex. 15 | 0.1 | 0.01 | 18 | 5 |
| Ex. 16 | 0.1 | 0.05 | no gel | 25 |
| Ex. 17 | 0.1 | 0.02 | 18 | 10 |
| Ex. 18 | 0.1 | 0.03 | 14 | 15 |
| Ex. 27 | 0.4 | 0.4 | 32 | 100 |
| Ex. 28 | 0.5 | 2 | 98 | 400 |
| Ex. 29 | 0.5 | 3 | 159 | 600 |
| Ex. 35 | 0.5 | 1 | 56 | |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. §112(a), and 35 U.S.C. §132(a).

Various aspects of the subject matter described herein are set out in the following numbered clauses:

1. A polymeric oil or gas wellbore plug comprising the reaction product of an aliphatic isocyanate, a trimerization catalyst, and a catalyst retarder, wherein the reaction occurs in the wellbore at a temperature of at least 250° F. (121° C.).

2. The polymeric oil or gas wellbore plug according to clause 1, wherein the aliphatic isocyanate is selected from the group consisting of ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanatocyclohexyl)methane (H12MDI); cyclohexane 1,4-diisocyanate; bis-(4-isocyanato-3-methyl-cyclohexyl)methane; isomers of any thereof; or combinations of any thereof.

3. The polymeric oil or gas wellbore plug according to one of clauses 1 and 2, wherein the trimerization catalyst is selected from the group consisting of potassium acetate, tin octoate, potassium octoate, tributyltin oxide, methylcholine and benzyltrimethylammonium hydroxide (TRITON B).

4. The polymeric oil or gas wellbore plug according to any one of clauses 1 to 3, wherein the catalyst retarder comprises an acid in amounts that stabilize the reaction at various temperatures above 250° F. (121° C.).

5. The polymeric oil or gas wellbore plug according to any one of clauses 1 to 4, wherein the catalyst comprises potassium octoate and the catalyst retarder comprises octanoic acid.

6. The polymeric oil or gas wellbore plug according to any one of clauses 1 to 5, wherein the wellbore temperature is between 250° F. (121° C.) and 300° F. (149° C.).

7. A method of reducing fluid loss from an oil or gas well, comprising producing a polyisocyanurate cement by combining an aliphatic isocyanate, a trimerization catalyst, and a catalyst retarder within a wellbore at a temperature of at least 250° F. (121° C.).

8. The method according to clause 7, wherein the aliphatic isocyanate is selected from the group consisting of ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanatocyclohexyl)methane (H12MDI); cyclohexane 1,4-diisocyanate; bis-(4-isocyanato-3-methyl-cyclohexyl)methane; isomers of any thereof; or combinations of any thereof.

9. The method according to one of clauses 7 and 8, wherein the trimerization catalyst is selected from the group consisting of potassium acetate, tin octoate, potassium octoate, tributyltin oxide, methylcholine and benzyltrimethylammonium hydroxide (TRITON B).

10. The method according to any one of clauses 7 to 9, wherein the catalyst retarder comprises an acid in amounts that stabilize the reaction at various temperatures above 250° F. (121° C.).

11. The method according to any one of clauses 7 to 10, wherein the catalyst comprises potassium octoate and the catalyst retarder comprises octanoic acid.

12. The method according to any one of clauses 7 to 11, wherein the wellbore temperature is between 250° F. (121° C.) and 300° F. (149° C.).

13. A method of reducing or preventing flow of one of more of a fluid and a gas through a conduit comprising producing within the conduit a polyisocyanurate by reacting an aliphatic isocyanate, a trimerization catalyst, and a catalyst retarder.

14. The method according to clause 13, wherein the reaction occurs at a temperature of from 32° F. to 212° F. (0° C. to 100° C.).

15. The method according to one of clause 13 and 14, wherein the reaction occurs at a temperature of from 59° F. to 176° F. (15° C. to 80° C.)

16. The method according to any one of clauses 0.13 to 15, wherein the reaction occurs at a temperature of from 68° F. to 140° F. (20° C. to 60° C.).

17. The method according to any one of clauses 13 to 16, wherein the aliphatic isocyanate is selected from the group consisting of ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanatocyclohexyl)methane (H12MDI); cyclohexane diisocyanate; bis-(4-isocyanato-3-methyl-cyclohexyl)methane; isomers of any thereof; or combinations of any thereof.

18. The method according to any one of clauses 13 to 17, wherein the trimerization catalyst is selected from the group consisting of potassium acetate, tin octoate, potassium octoate, tributyltin oxide, methylcholine and benzyltrimethylammonium hydroxide (TRITON B).

19. The method according to any one of clauses 13 to 18, wherein the catalyst retarder comprises an acid in amounts that stabilize the reaction at various temperatures above 250° F. (121° C.).

20. The method according to any one of clauses 13 to 19, wherein the catalyst comprises potassium octoate and the catalyst retarder comprises octanoic acid.

21. An oil or gas wellbore containing a polyisocyanurate comprising the reaction product of an aliphatic isocyanate, a trimerization catalyst, and a catalyst retarder.

22. The oil or gas wellbore according to clause 21, wherein the reaction occurs at a temperature of from 68° F. to 482° F. (20° C. to 250° C.).

23. The oil or gas wellbore according to one of clauses 21 and 22, wherein the reaction occurs at a temperature of from 104° F. to 392° F. (40° C. to 200° C.).

24. The oil or gas wellbore according to any one of clauses 21 to 23, wherein the reaction occurs at a temperature of from or from 140° F. to 302° F. (60° C. to 150° C.).

25. The oil or gas wellbore according to clause 19, wherein the reaction occurs in the wellbore at a temperature of from 250° F. (121° C.) to 300° F. (149° C.).

What is claimed is:

1. A polymeric oil or gas wellbore cement comprising the reaction product of an aliphatic isocyanate, a trimerization catalyst, and a catalyst retarder, wherein the reaction occurs at a temperature of at least 250° F. (121° C.), wherein the catalyst is tin octoate or potassium octoate, and wherein the catalyst retarder comprises octanoic acid.

2. The polymeric oil or gas wellbore cement according to claim 1, wherein the trimerization catalyst is selected from the group consisting of potassium acetate, tin octoate, potassium octoate, tributyltin oxide, methylcholine and benzyltrimethylammonium hydroxide (TRITON B).

3. The polymeric oil or gas wellbore cement according to claim 1, wherein the temperature is between 250° F. (121° C.) and 300° F. (149° C.).

4. A polymeric oil or gas wellbore plug, comprising the wellbore cement according to claim 1.

5. A polymeric oil or gas wellbore cement comprising the reaction product of:
an aliphatic isocyanate selected from the group consisting of ethylene diisocyanate; 1,4-tetramethylene diisocyanate; 1,6-hexamethylene diisocyanate (HDI); 2,2,4-trimethyl -1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis -(4-isocyanato-cyclohexyl)methane (H12MDI); cyclohexane 1,4-diisocyanate; bis-(4-isocyanato-3-methyl-cyclohexyl) methane; isomers of any thereof; or combinations of any thereof;
a trimerization catalyst selected from the group consisting of tin octoate and potassium octoate; and
a catalyst retarder comprising octanoic acid,
wherein the reaction occurs at a temperature of at least 250° F. (121° C.).

6. The polymeric oil or gas wellbore cement according to claim 5, wherein the temperature is between 250° F. (121° C.) and 300° F. (149° C.).

7. A polymeric oil or gas wellbore plug, comprising the wellbore cement according to claim 5.

* * * * *